(12) United States Patent
Kang et al.

(10) Patent No.: US 11,619,270 B2
(45) Date of Patent: Apr. 4, 2023

(54) LOCK-UP DEVICE FOR TORQUE CONVERTER

(71) Applicant: Valeo Kapec Co., Ltd., Daegu (KR)

(72) Inventors: Juseok Kang, Daegu (KR); Sangmin Yang, Daegu (KR); Eu Sub Kwon, Daegu (KR); Soon-Cheol Shin, Suwon-si (KR)

(73) Assignee: Valeo Kapec Co., Ltd., Daegu (KR)

( * ) Notice: Subject to any disclaimer, the term of this patent is extended or adjusted under 35 U.S.C. 154(b) by 535 days.

(21) Appl. No.: 16/728,200

(22) Filed: Dec. 27, 2019

(65) Prior Publication Data

US 2020/0208684 A1 Jul. 2, 2020

(30) Foreign Application Priority Data

Dec. 28, 2018 (KR) .................. 10-2018-0171783
Jun. 5, 2019 (KR) .................. 10-2019-0066577

(51) Int. Cl.
| | | |
|---|---|---|
| *F16D 3/12* | (2006.01) | |
| *F16F 15/14* | (2006.01) | |
| *F16F 15/123* | (2006.01) | |
| *F16H 45/02* | (2006.01) | |

(52) U.S. Cl.
CPC .......... *F16D 3/12* (2013.01); *F16F 15/12353* (2013.01); *F16F 15/1421* (2013.01); *F16H 45/02* (2013.01); *F16H 2045/0221* (2013.01); *F16H 2045/0231* (2013.01); *F16H 2045/0263* (2013.01); *F16H 2045/0278* (2013.01); *F16H 2045/0294* (2013.01)

(58) Field of Classification Search
CPC ... F16D 3/12; F16F 15/12353; F16F 15/1421; F16F 15/1407; F16H 45/02; F16H 2045/0231; F16H 2045/0278; F16H 2045/0294; F16H 41/04; F16H 41/24; F16H 2045/0263; F16H 2045/0221
See application file for complete search history.

(56) References Cited

U.S. PATENT DOCUMENTS

| | | | |
|---|---|---|---|
| 8,771,088 B2 * | 7/2014 | Takikawa .......... | F16F 15/12366 464/68.8 |
| 2007/0181395 A1 * | 8/2007 | Mueller .................. | F16H 45/02 192/3.29 |
| 2014/0216879 A1 * | 8/2014 | Gerdeman ............. | F16H 45/02 192/3.28 |
| 2016/0123402 A1 * | 5/2016 | Avins ...................... | F16H 41/04 60/338 |
| 2016/0195157 A1 * | 7/2016 | Takikawa ................. | F16D 3/12 60/330 |
| 2017/0108050 A1 * | 4/2017 | Lee ......................... | F16H 45/02 |

(Continued)

FOREIGN PATENT DOCUMENTS

| | | |
|---|---|---|
| JP | 2008-256017 A | 10/2008 |
| JP | 2009-115112 A | 5/2009 |

*Primary Examiner* — Charles A Fox
*Assistant Examiner* — Farhana Pervin
(74) *Attorney, Agent, or Firm* — Oblon, McClelland, Maier & Neustadt, L.L.P.

(57) ABSTRACT

The present invention relates to a lock-up device for a torque converter which has a simple structure compared to the prior art, which reduces manufacturing costs, and which may reduce a size of the entire torque converter and improve a damping ability of the dynamic damper by minimizing an installation space of a dynamic damper.

6 Claims, 7 Drawing Sheets

(56) References Cited

U.S. PATENT DOCUMENTS

2017/0138436 A1* 5/2017 Takikawa ................ F16H 45/02
2017/0211631 A1* 7/2017 Cerreta .................... F16D 3/12
2017/0219047 A1* 8/2017 Grossgebauer ......... F16H 45/02

* cited by examiner

LOCK-UP DEVICE FOR TORQUE CONVERTER

CROSS-REFERENCE TO RELATED APPLICATION

This application claims priority to and the benefit of Korean Patent Application No. 10-2018-0171783 filed in the Korean Intellectual Property Office on Dec. 28, 2018, and Korean Patent Application No. 10-2019-0066577 filed in the Korean Intellectual Property Office on Jun. 5, 2019, the entire contents of which are incorporated herein by reference.

BACKGROUND OF THE INVENTION

(a) Field of the Invention

The present invention relates to a lock-up device used in a torque converter as a power delivery device of a fluid type, and more particularly relates to a lock-up device for a torque converter, which may reduce a manufacturing cost by providing a simpler structure than a conventional one, and may reduce a size of the torque converter as a whole and improve a damping ability of a dynamic damper by minimizing an installation space of the dynamic damper.

(b) Description of the Related Art

As a power delivery device of a fluid type for transmitting power generated from an engine of a vehicle to a transmission, a torque converter particularly having a lock-up device has been widely applied.

The lock-up device is a device that transmits a torque by mechanically connecting a front cover of the torque converter and a turbine, and is disposed in a space between the turbine and the front cover. This lock-up device transfers the torque directly from the front cover to the turbine without passing through an impeller.

Generally, the lock-up device has a piston and a damper mechanism.

The piston is disposed to be movable along a rotation axis direction, and if the piston is pressed against the front cover, the piston engages with the front cover and rotates by receiving the torque from the front cover through a friction force.

The damper mechanism absorbs and attenuates the torsional vibration transmitted to the front cover and transmits it to the output member, and includes an elastic member that elastically connects the input member and the output member that rotates integrally with the piston, preferably a coil spring.

On the other hand, in addition to the damper mechanism for the purpose of absorbing and damping the torsional vibration, as a technology for improving vibration damping performance by lowering a resonance frequency below a practical rotation speed, a technology related to a dynamic damper configured by installing an inertial mass body on a torque transmission path has been developed and applied.

In this regard, Korean Patent Publication No. 10-2017-0078607 discloses a dynamic damper including a configuration in which an inertial mass body is connected to an outer end of an output member by a coil spring.

However, the dynamic damper disclosed in the prior document has a problem that a radial direction size of a torque converter is increased because the dynamic damper is disposed in the radial direction outside with respect to an outer coil spring corresponding to a first damper mechanism as a torsion damper.

In addition, for the dynamic damper disclosed in the prior document, it is difficult to secure a sufficient size for the inertial mass body due to the limitation of the occupied space of the dynamic damper, and thus the inertial force of the inertial mass body is insufficient, such that the damping performance of the dynamic damper is insufficient.

In addition, the dynamic damper disclosed in the prior document is configured to radially extend the outer end of the output member to form a connection portion for the dynamic damper, so that the shape of the output member is complicated and the manufacturing cost for the output member is increased.

PRIOR DOCUMENT

Patent Document (Patent Document 0001) Korean Registered Patent Publication No. 10-2017-0078607

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made to solve the problems described above, and is to provide a lock-up device for a torque converter which may be made compact by reducing a radial size of the torque converter by installing a dynamic damper in a radial direction inside with respect to a coil spring configuring a torsion damper mechanism and directly installing a dynamic damper on an output member without a connection member.

In addition, the present invention is to provide a lockup device for a torque converter by simplifying a configuration of a torsion damper mechanism to secure an installation space of an additional inertial mass in the radial direction inside of the lock-up device, and to enable a turbine to be used as an inertial mass body to improve damping performance of the dynamic damper.

Further, the present invention is to provide a lock-up device for a torque converter that may reduce a manufacturing cost by omitting an intermediate member between the input member and the output member and simplifying a shape of a driven plate as the output member.

A lock-up device for a torque converter according to the present invention includes: an input member to which a torque is input from the front cover through a friction force; an output member connected to an output hub to be integrally rotated and provided to be relatively rotatable with respect to the input member; a first elastic body elastically connecting the input member and the output member with respect to the rotational direction; and a dynamic damper directly installed to the output member, wherein the dynamic damper is disposed in the radial direction inside with respect to the first elastic body.

The dynamic damper may include: an inertial mass body disposed to be in close contact with the output member so as to be relatively rotatable with respect to the output member; and a second elastic member elastically connecting the inertial mass body and the output member with respect to the rotational direction, while the inertial mass body and the second elastic member may be disposed to at least partially overlap the first elastic member with respect to a rotation axis direction when viewing in the radial direction.

The inertial mass body may include: a first mass plate disposed in close contact with one side surface of the output member; and a second mass plate disposed in close contact with the other side of the output member and integrally rotating with the first mass plate, while the first mass plate and the second elastic member are disposed to entirely overlap the first elastic member with respect to the rotation axis direction when viewing in the radial direction.

The dynamic damper may further include an additional mass body to increase inertia, and the additional mass body may be fixed to the first mass plate at the position more inward in the radial direction than the second elastic body.

The second mass plate may include a connection protrusion extending toward the turbine, and the second mass plate may be connected to the turbine through the connection protrusion such that the second mass plate and the turbine are integrally rotated.

A connection plate connecting the turbine and the second mass plate to be integrally rotated may be further included, and the connection plate may include an engaging groove portion to which the connection protrusion is inserted and engaged in the rotation axis direction.

The connection plate may be supported by the output hub to be relatively rotatable.

The lock-up device for a torque converter according to the present invention has the dynamic damper installed in the radial direction inside with respect to the coil spring constituting the torsion damper mechanism and has the dynamic damper directly installed in the output member without a connecting member so that the radial size of the torque converter is reduced, thereby having an effect of being compactable.

In addition, the lock-up device for the torque converter according to the present invention simplifies the configuration of the torsion damper mechanism to secure an installation space of an additional inertial mass inside the radial direction of the lock-up device, and to utilize the turbine as an inertial mass, thereby improving the damping performance of the dynamic damper.

Further, the lock-up device for a torque converter according to the present invention has the effect of reducing the manufacturing cost by omitting the intermediate member between the input member and the output member and simplifying the shape of the driven plate as the output member.

DETAILED DESCRIPTION OF THE EMBODIMENTS

Figure 1:
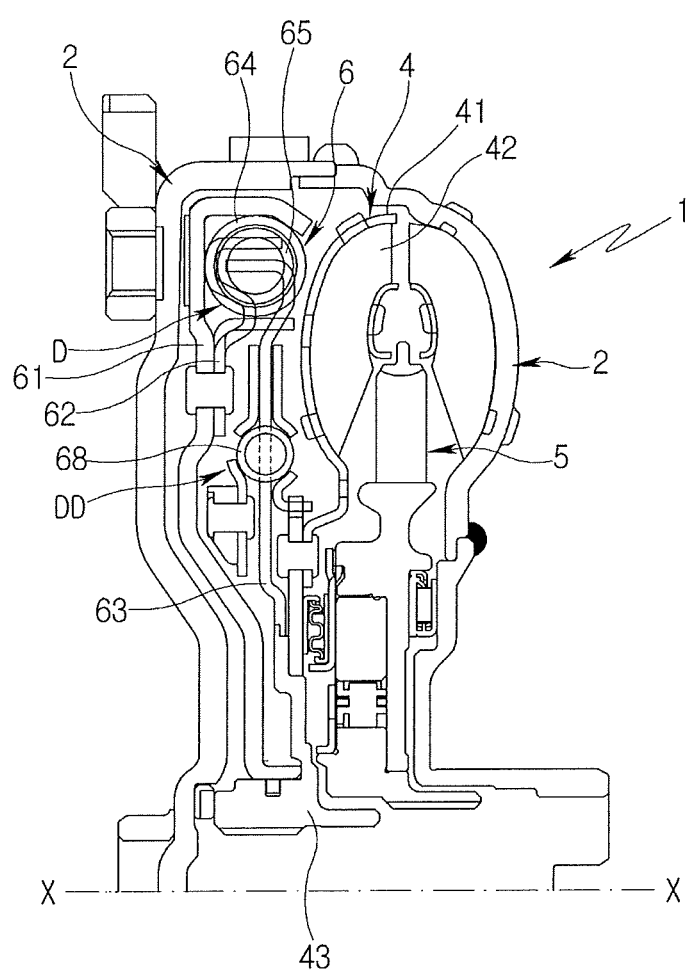
FIG. 1 is a cross-sectional view of a rotation axis line direction of a torque converter including a lock-up device according to an exemplary embodiment of the present invention.

Hereinafter, a lock-up device for a torque converter according to the present invention is described with reference to accompanying drawings.

As the invention allows for various changes and numerous embodiments, particular embodiments will be illustrated in the drawings and described in detail in the written description. This, however, is by no means meant to restrict the invention to the specific embodiments, and it is to be understood to include all changes, equivalents, and substitutes included in the spirit and scope of the present invention.

In the following description of the present invention, terms including ordinal numbers such as first, second, and the like may be used to describe various constituent elements, however the constituent elements are not limited by the terms. The terms are used only to distinguish one constituent element from other constituent elements. For example, a first constituent element may be referred to as a second constituent element, and similarly, the second constituent element may be referred to as the first constituent element within the scope of the appended claims.

Also, a term "and/or" includes a combination of a plurality of described items or any item among the plurality of described items.

Also, in this specification, it is to be understood that when one component is referred to as being "connected" or "coupled" to another component, it may be connected or coupled directly to the other component or may be connected or coupled to another component with the other component intervening therebetween. On the other hand, in this specification, it is to be understood that when one component is referred to as being "connected or coupled directly" to another component, it may be connected or coupled to the other component without another component intervening therebetween.

It is also to be understood that the terminology used herein is only for the purpose of describing particular embodiments, and is not intended to be limiting of the invention. Singular forms are to include plural forms unless the context clearly indicates otherwise.

It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof.

Unless indicated otherwise, all the terms used herein, including technical or scientific terms, have the same meanings as those generally understood by those with ordinary knowledge in the field of art to which the present invention belongs. It must be understood that the terms defined by the dictionary are consistent with the meanings within the context of the related art, and they should not be ideally or excessively formally defined unless the context clearly dictates otherwise.

Also, the present embodiments are provided so that this disclosure will be thorough and complete, and will fully convey the scope of the invention to those skilled in the art, and in the drawings, the shapes and dimensions may be exaggerated for clarity.

<Overall Configuration of a Torque Converter>

Figure 2:
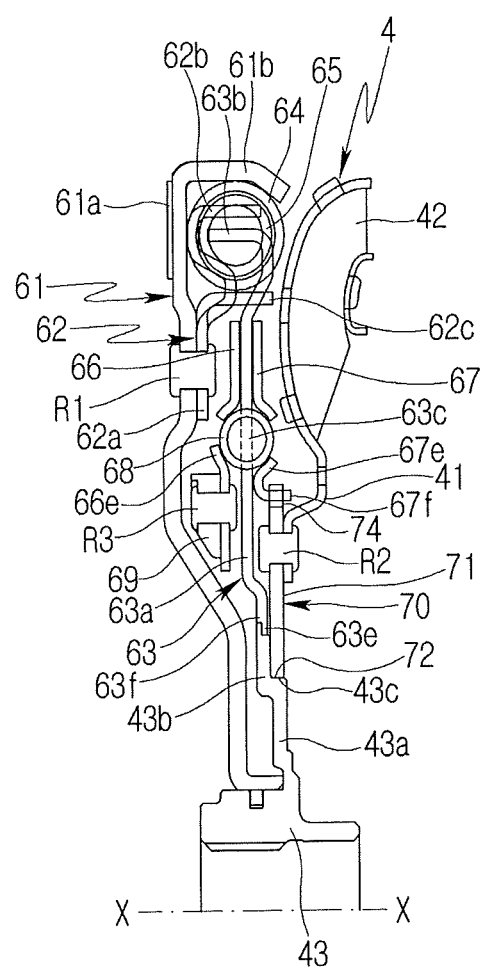
FIG. 2 is a partial enlarged view of FIG. 1.
Figure 3:
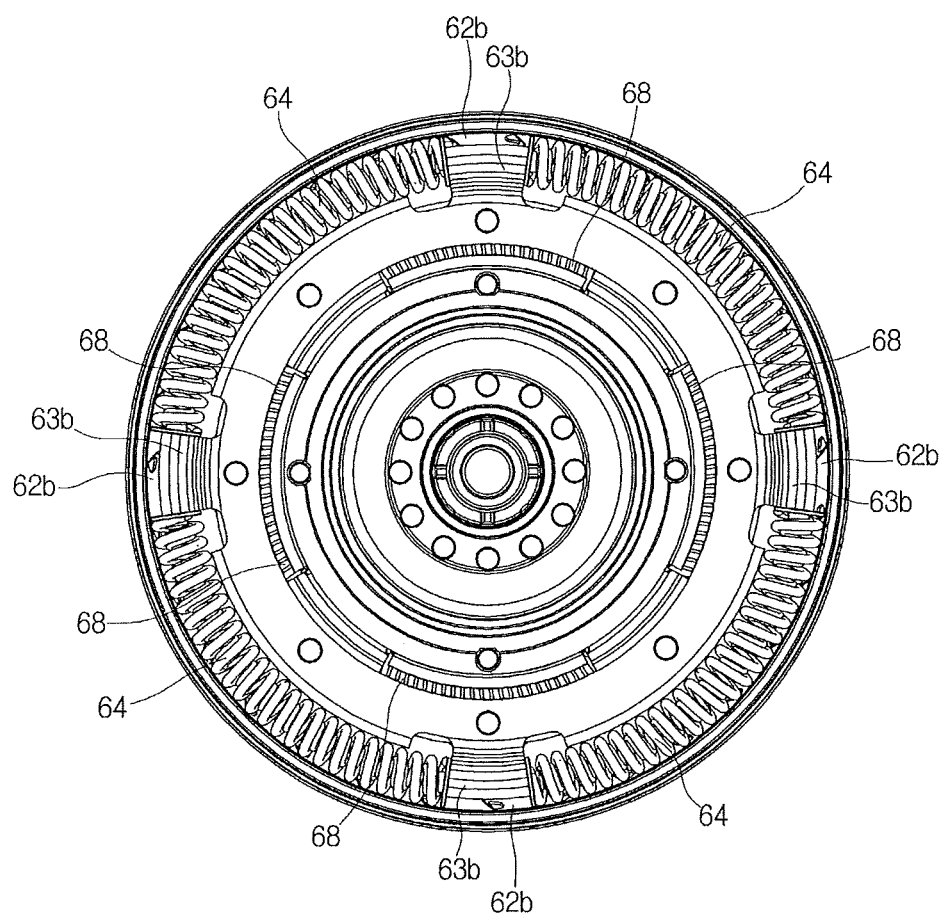
FIG. 3 is a cross-sectional view of a torque converter shown in FIG. 1 in a direction perpendicular to a rotation axis line.

FIG. 1 is a cross-sectional view of a rotation axis (X-X) direction of a torque converter 1, FIG. 2 is a partial enlarged view of FIG. 1, and FIG. 3 is a cross-sectional view in a direction perpendicular to a rotation axis (X-X) of a torque converter 1 shown in FIG. 1. An overall configuration of a torque converter 1 having a lock-up device 6 according to the embodiment of the present invention is described with reference to FIG. 1 to FIG. 3.

The torque converter 1 is a device for transmitting power from a crankshaft of an engine (not shown) to an input shaft of a transmission (not shown) and is configured including a front cover 2 to which a torque of a crankshaft is input, an impeller 3 connected to the front cover 2, a turbine 4 supported by an output hub 43 to be relatively rotatable, a stator 5 disposed between the impeller 3 and the turbine 4, and the lock-up device 6 disposed between the front cover 2 and the turbine 4.

The impeller 3 is fixed to the front cover 2, and a fluid chamber is formed therein by the front cover 2 and the impeller 3.

The turbine 4 is disposed to face the impeller 3 inside the fluid chamber. The turbine 4 includes a turbine shell 41 and a plurality of turbine blades 42 fixed to the turbine shell 41. The turbine 4 is configured to act as an inertial mass during the operation of the lockup device 6 as described below, and for this, the turbine shell 41 is supported by the output hub 43 via a connection plate 70 described below to be relatively rotatable.

The output hub 43 has an internal structure such that it may be connected to an input shaft of a transmission (not shown) so that the output of the lockup device 6 may be delivered to the transmission. Also, on the external circumferential surface of the output hub 43, a first flange portion 43a extending in the radial direction and a second flange portion 43b formed extending from the radial direction outer end of the first flange portion 43a while forming a step portion 43c with respect to the first flange portion 43a are provided.

The stepped portion 43c between the first flange portion 43a and the second flange portion 43b acts as a bearing that is in contact with an inner circumferential end 72 of the connecting plate 70 to be described later to rotatably support the connecting plate 70, and an output member of the lockup apparatus 6 mentioned later is fastened to the radial direction outer end of the second flange part 43b.

The stator 5 is a mechanism for adjusting a flow of a hydraulic oil from the turbine 4 to the impeller 3, and is disposed between the impeller 3 and the turbine 4.

<Configuration of the Lock-Up Device>

The lockup device 6 serves to mechanically connect the front cover 2 and the turbine 4 as necessary, and is disposed in the space between the front cover 2 and the turbine 4 as shown in FIG. 1.

As shown in FIG. 2, the lock-up device 6 includes a piston 61 and a drive plate 62 as an input member, a driven plate 63 as an output member, a damper mechanism D elastically connecting the drive plate 62 and the driven plate 63, and a dynamic damper DD installed directly on the driven plate 63 for improving vibration damping performance.

Piston

The piston 61 functions to switch a torque transmission path between the front cover 2 and the turbine 4, and is installed to directly receive the torque of the front cover 2 through the friction force when it is pressed to the front cover 2 side by the action of the hydraulic pressure to be in close contact with the inner surface of the front cover 2.

For this, the inner end of the piston 61 is supported to be movable by the output hub 43 in a rotation axis (X-X) direction, and is also supported to be relatively rotatable with respect to the output hub 43. In addition, a friction member 61a as a means for increasing the friction force and effectively transmitting the torque of the front cover 2 to the piston 61 is installed on one side of the piston 61 facing the inner surface of the front cover 2.

On the other hand, the piston 61 of the lock-up device 6 according to an embodiment of the present invention, in addition to the function of switching the torque transmission path between the front cover 2 and the turbine 4 described above, performs a function of preventing the separation of a plurality of first coil springs 64 as the damper mechanism to be described later and effectively supporting them.

For the separation preventing and supporting of the first coil spring 64, a support edge 61b formed to be bent in the rotational axis X-X direction is provided on the outer circumferential side of the piston 61. As shown in FIG. 2, the support edge 61b is integrated with the piston 61 by forming a part of the outer circumference part of the piston 61 having a substantially disc shape to be bent in the rotational axis (X-X) direction, and the free end side of the support edge 61b is partially bent inward in the radial direction.

The separation of the first coil spring 64 in the radial direction and the rotation axis (X-X) direction may be prevented through the support edge 61b, the interior circumference shape of the piston 61 and a spring holding protrusion 62c of the drive plate 62 described later may be effectively supported through the relatively simple structure without adding a separate member.

Drive Plate

The drive plate 62 is fixed to the above-described piston 61 to function as the input member along with the piston 61, and simultaneously performs a function of supporting the first coil spring 64 corresponding to the damper mechanism D.

The drive plate 62 is firmly fixed to the piston 61 at a plurality of positions through the rivet R1 so as to act as the input member together with the piston 61.

Also, the drive plate 62 includes a spring locking portion 62b as a means for transmitting the input torque to the driven plate 63, which is described later, through the first coil spring 64, and the spring holding protrusion 62c as a means for supporting the first coil spring 64.

The spring locking portion 62b as a part extending by bending the part of the exterior circumference of a main body portion 62a of the right shape of the drive plate 62 in the rotation axis (X-X) direction is formed in plural throughout the exterior circumference of the main body portion 62a, disposed between the ends of the plurality of first coil springs 64, and supports the end of the first coil spring 64 in the rotational direction.

The spring holding protrusion 62c as a part for supporting the first coil spring 64 in the radial direction is formed by a method of bending the part of the exterior circumference of the main body portion 62a in the rotation axis (X-X) direction, and is provided between the rotational direction of the spring locking portions 62b. The spring holding protrusion 62c is in contact with the first coil spring 64 in the radial direction inside, and the support edge 61b of the piston 61 described above is in contact with the first coil spring 64 in the radial direction outside, thereby the radial direction support structure of the first coil spring 64 is formed in this state.

As such, the spring locking portion 62b for torque transmission and the spring holding protrusion 62c for supporting the first coil spring 64 are formed by partially cutting or bending the main body portion 62a of the drive plate 62, and all are integrated with the main body portion 62a. Therefore, since a separate member having the purpose of transmission of the torque or the purpose of holding of the first coil spring 64 may be omitted, the structure of the lock-up device 6 may be simplified and the manufacturing cost may be significantly reduced compared with the conventional art.

First elastic body—the first coil spring 64

The first coil spring 64 as a first elastic body constituting the damper mechanism has a function of elastically connecting the drive plate 62 and the driven plate 63 to be described later in the rotational direction to absorb a torsional vibration, and is supported by the support edge 61b of the piston 61, the spring holding protrusion 62c of the drive plate 62, and the inner surface of the piston 61 in the rotation axis (X-X) direction and the radius direction.

The first coil spring 64 is supported by the spring engaging portion 62b of the drive plate 62 and the outer locking portion 63b of the driven plate 63 so as to be elastically deformable in the rotational direction.

Meanwhile, as illustrated in FIG. 2, an auxiliary coil spring 65 that performs the same function as the first coil spring 64 may be additionally disposed inside the first coil spring 64. The auxiliary coil spring 65 may be further provided when the damping function cannot be effectively secured only by the first coil spring 64 according to the magnitude of torque and vibration transmitted. Although the present invention is not limited thereto, the following description is made based on the embodiment in which an auxiliary coil spring 65 is further provided inside the first coil spring 64.

Driven Plate

The driven plate 63 is fastened to the second flange portion 43b of the output hub 43 to be integrally rotated with the output hub 43, and acts as an output member to be relatively rotatable with respect to the piston 61 and the drive plate 62 so as to finally transmit the torque transmitted through the first coil spring 64 and the auxiliary coil spring 65 from the piston 61 and the drive plate 62 as the input member without an intermediate connection member to the output hub 43.

Therefore, the driven plate 63 of the lock-up device 6 according to an embodiment of the present invention is configured such that torque is directly transmitted from the piston 61 and the drive plate 62 which are input members, so that the intermediate member may be omitted, since the shape of the driven plate, which has been conventionally configured as a double plate structure, may be simplified and configured as a single plate member, the manufacturing cost may be reduced.

Figure 4:
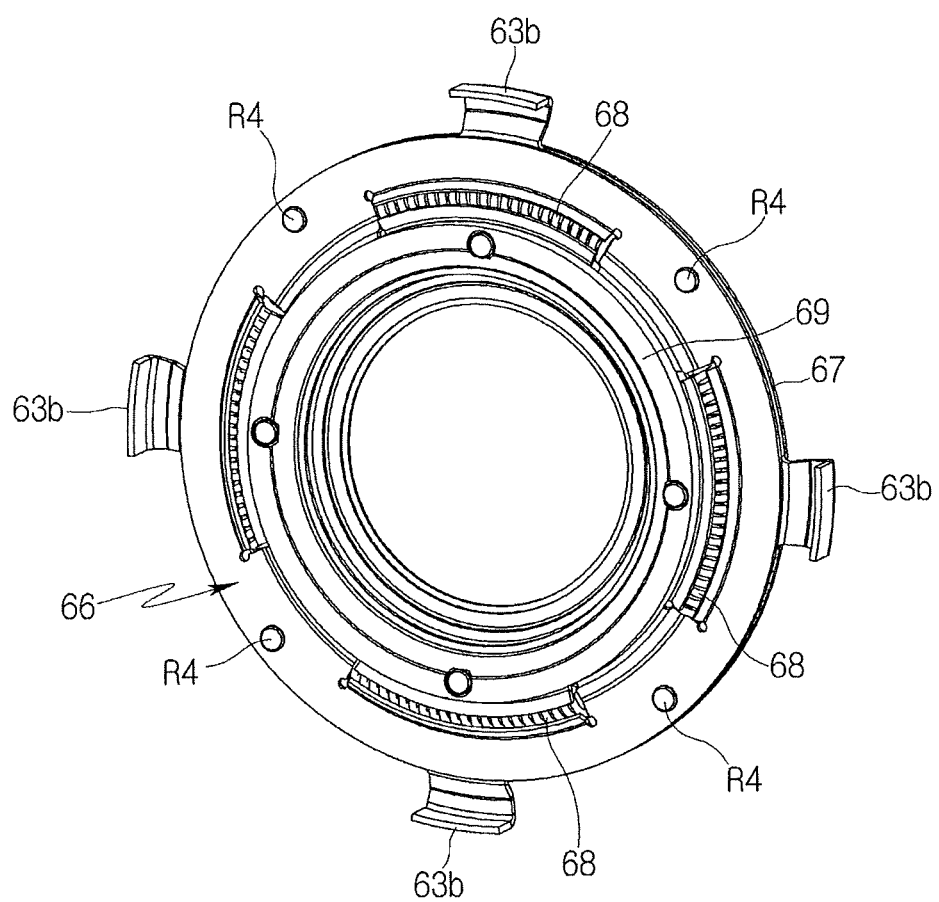
FIG. 4 is a perspective view of a driven plate and a dynamic damper assembly of a lock-up device according to an exemplary embodiment of the present invention.
Figure 5:
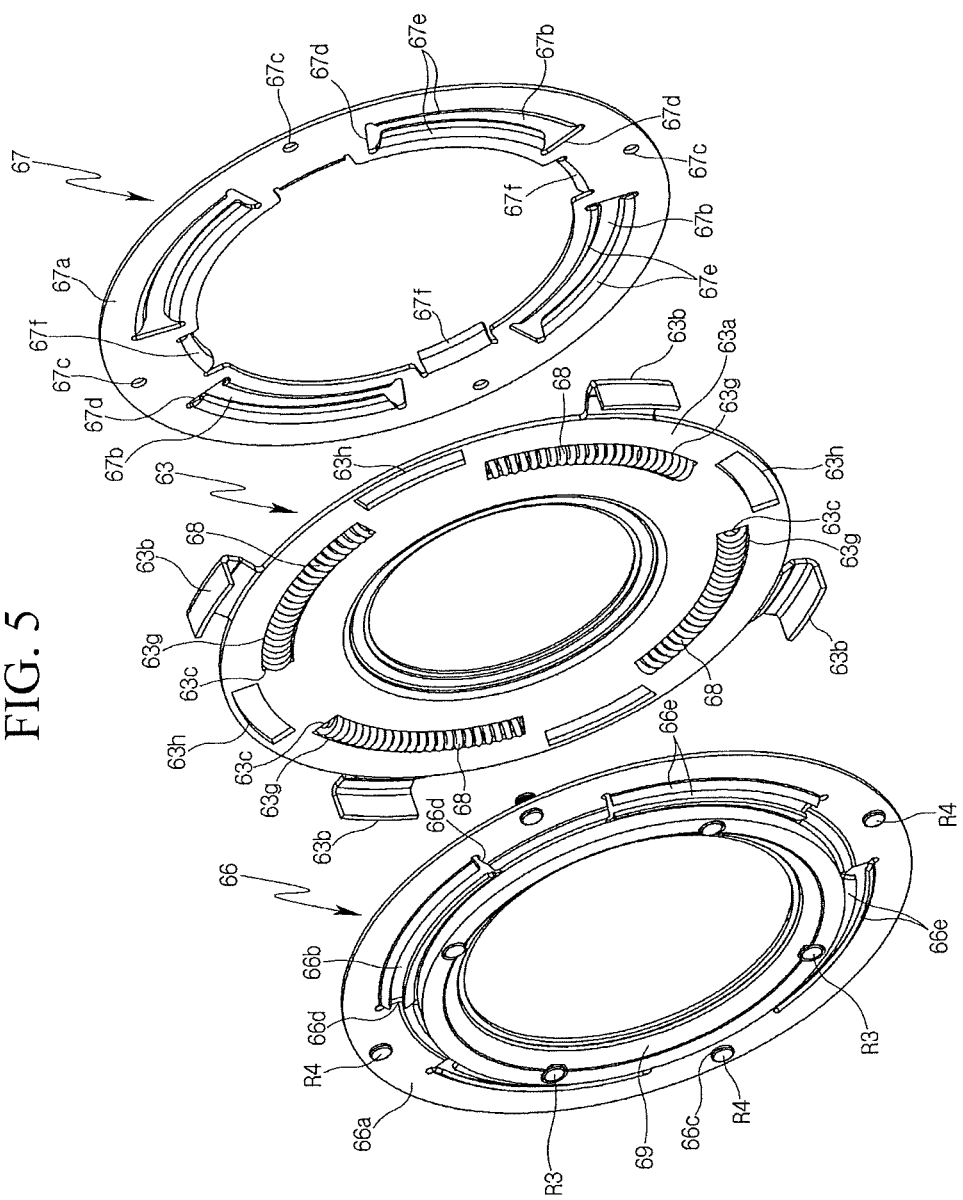
FIG. 5 is an exploded perspective view of FIG. 4.
Figure 6:
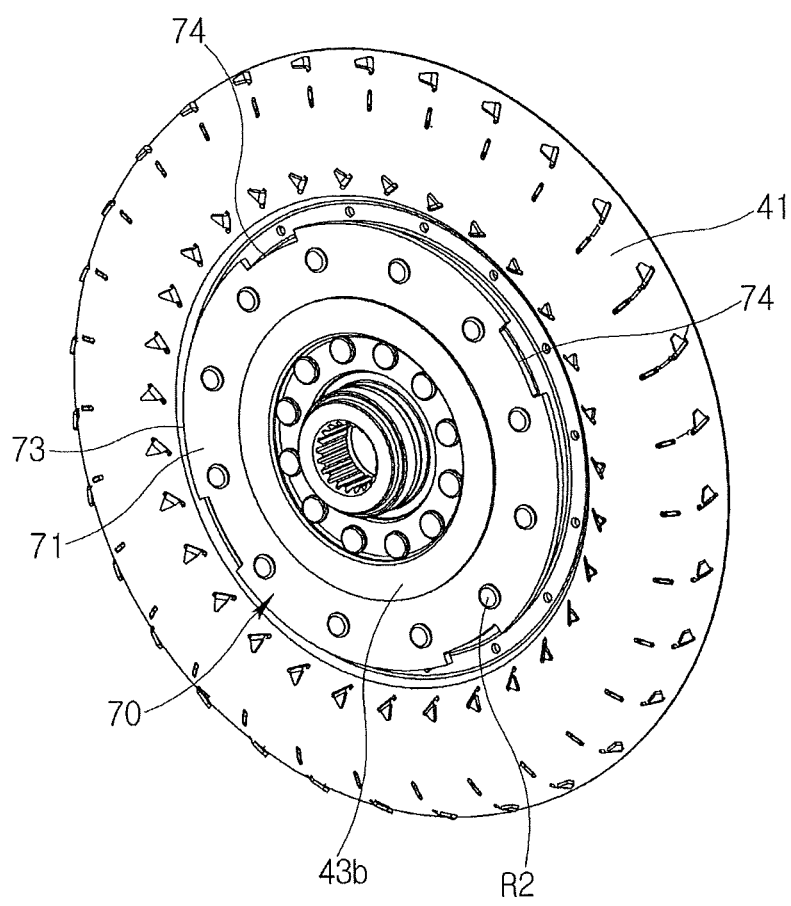
FIG. 6 is a perspective view to explain a connection plate and an output hub of a lock-up device according to an exemplary embodiment of the present invention.

The configuration of the driven plate 63 is shown in detail in FIG. 4 and FIG. 5.

Referring to FIG. 4 and FIG. 5, the driven plate 63 has a ring-shaped body portion 63a formed by pressing and processing a single disc-shaped member and having a central hole 63d therein, and the hub connection portion 63f formed at the inner end 63e of the body portion 63a is firmly fastened to the second flange portion 43b of the above-described output hub 43 by welding or the like.

The body portion 63a includes an outer locking portion 63b to which the torque is transmitted through the first coil spring 64, a first spring hole 63g accommodating a second coil spring 68 of the dynamic damper DD described later, and a stopper hole 63h limiting a rotation range of the mass body of the dynamic damper DD.

The outer locking portion 63b as a part extending by bending the part of the exterior circumference of the body portion 63a of the ring shape in the rotation axis (X-X) direction is formed in plural throughout the exterior circumference of the body portion 63a, is disposed between ends of a plurality of first coil springs 64, and supports the end of the first coil spring 64 in the rotational direction.

In order to maintain the contact state for the first coil spring 64, the width in the rotational direction of the outer locking portion 63b of the driven plate 63 is set to be substantially equal to the width in the rotational direction of the spring locking portion 62b of the drive plate 62 as shown in FIG. 3.

The first spring hole 63g is formed in plural numbers corresponding to the number of the second coil springs 68 in the circumferential direction so as to accommodate the third coil springs 68 constituting the dynamic damper DD, and both end surfaces of the first spring hole 63g are maintained in contact with the second coil spring 68 to act as an inner locking portion 63c on which the elastic force of the second coil spring 68 acts.

The stopper hole 63h as a part where the rivet R4 integrally connecting a first mass plate 66 and a second mass plate 67 of the dynamic damper DD described later penetrates and extends is formed between the above-described first spring holes 63g and extends with a predetermined length in the rotational direction The relative rotation amount of the driven plate 63 with respect to the first mass plate 66 and the second mass plate 67 mentioned later is limited by the length of the rotational direction of the stopper hole 63h.

Inertial Mass Body

As the inertial mass body constituting the dynamic damper DD, the lock-up device 6 according to an exemplary embodiment of the present invention includes the first mass plate 66 and the second mass plate 67 that are disposed to be respectively in close contact with both side surfaces of the body portion 63a of the driven plate 63 to be relatively rotated with respect to the driven plate 63 as the output member.

As shown in FIG. 4 and FIG. 5, the first mass plate 66 and the second mass plate 67 of the driven plate 63 are formed of the ring member of the plate shape similar to the shape of the outer body portion 63a and disposed to be in close contact with both side surfaces of the body portion 63a of the driven plate 63, respectively.

Also, the first mass plate 66 and the second mass plate 67 are disposed in the inside of the first coil spring 64 in the radial direction and simultaneously disposed to at least partially overlap the first coil spring 64 with respect to the rotation axis (X-X) direction when viewing in the radial direction, and preferably, the first mass plate 66 and the later-described second coil spring 68 are disposed to overlap the first coil spring 64 with respect to the rotation axis (X-X) direction.

That is, the inertial masses, which are conventionally provided as a single body, are divided and disposed on both side surfaces of the driven plate 63 in the form of a ring-shaped plate to minimize the space occupied by the inertial masses, and are arranged in the radial direction inside with respect to the first coil spring 64, which is not in a range out of the first coil spring 64 in the radial direction to significantly reduce the radial direction dimension of the lockup device 6.

Furthermore, in the radial direction, the first mass plate 66 and the second mass plate 67 are at least partially overlapped with the first coil spring 64 with respect to the rotation axis (X-X) direction so that the dimension of the rotation axis (X-X) direction of the lock-up device 6 may be reduced.

At this time, the first mass plate 66 and the second mass plate 67 are fastened to each other through the aforementioned rivet R4 so as to have the same effect as a single mass and are integrally operated. To this end, rivet holes 66c and 67c are formed in the body portion 66a of the first mass plate 66 and the body portion 67a of the second mass plate 67, respectively, through which the rivet R4 extends. As described above, since the rivet R4 extends through the stopper hole 63h of the driven plate 63, the relative rotational amount of the driven plate 63 with respect to the first mass plate 66 and the second mass plate 67 is limited to the length of the rotational direction of the stopper hole 63h by the interaction of the rivet R3 and the stopper hole 63h.

In addition, the first mass plate 66 and the second mass plate 67 are configured to be directly connected to a second elastic body, preferably the second coil spring 68, which is a damper spring, without an intermediate connecting member, unlike the prior art.

To this end, the first mass plate 66 and the second mass plate 67 include a second spring hole 66b and a third spring hole 67b, respectively, by cooperating with each other so as to accommodate the second coil spring 68, and both end surfaces of each of the second spring hole 66b and the third spring hole 67b contact both ends of the second coil spring 68 to act as the spring locking portions 66d and 67d pressing both ends of the second coil spring 68 during the damping action.

The second spring hole 66b and the third spring hole 67b are formed to have substantially the same length of the rotational direction as the first spring hole 63g of the driven plate 63 described above.

The second spring hole 66b and the third spring hole 67b may be formed by cutting and bending the part of each body portion 66a and 67a corresponding to the first spring hole 63g of the driven plate 63, and the parts bent in the inside and outside in the radial direction support the second coil spring and act as spring holding protrusions 66e and 67e for preventing separation.

As such, the first mass plate 66 and the second mass plate 67 are configured to be directly connected to the second coil spring 68 without an intermediate connecting member, unlike the conventional art, and to autonomously have the maintaining structure of the second coil spring 68 through the spring holding protrusion 66e and 67e without a separate spring maintaining member, thereby simplifying the structure of the lockup device 6 compared with the conventional art and additionally significantly reducing the manufacturing cost.

Furthermore, it is necessary to increase the damping capability of the dynamic damper DD according to the magnitude of the torque transmitted to the driven plate 63 and the resonance frequency while minimizing the space occupied by the inertial mass. To this end, the lockup device according to an embodiment of the present invention may include an additional mass 69 for increasing the inertia of the inertial mass or may be configured to utilize the turbine 4 as an inertial mass.

The additional mass body 69, as shown in FIG. 4 and FIG. 5, may be formed to have a ring shape fixed to the first mass plate 66 by using the rivet R3 at the position of the radial direction inner side from the second coil spring.

At this time, the additional mass 69 is preferably disposed in the space between the first mass plate 66 and the inner surface of the piston 61 in order to increase the space utilization. The shape and size of the additional mass 69 shown in this case can be applied in various ways depending on the damping capacity required, and such modifications are naturally within the scope of the present invention.

Meanwhile, as a means for utilizing the turbine 4 as an inertial mass, the lockup device 6 according to the embodiment of the present invention includes a connection plate 70 so as to connect the turbine shell 41 and the first mass plate 66 to be rotated integrally with each other.

Figure 7:
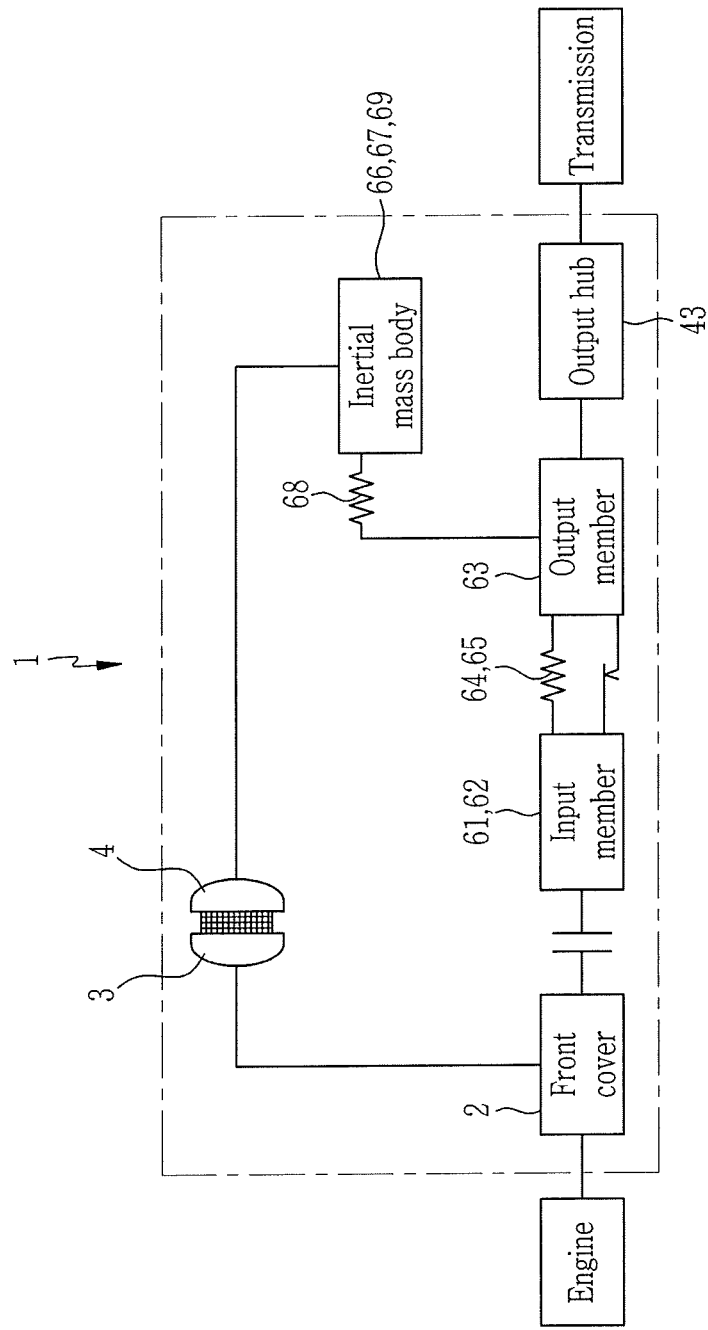
FIG. 7 is a schematic diagram for illustrating a torque transmission process of a torque converter.

As shown in FIG. 7, the connecting plate 70 includes a ring-shaped disk portion 71 having a hole formed at the center thereof, and the disk portion 71 is fixed to the turbine shell 41 at a plurality of positions through the rivet R2.

In a state that the circular inner circumferential end 72 of the disk portion 71 is in contact with the step portion 43c of the output hub 43, the connection plate 70 is supported by the step portion 43c of the output hub 43 to be relatively rotatable.

At an exterior circumference end 73 of the disc portion 71, a plurality of engaging groove portions 74 to which connecting projections 67f of the above-described second mass plate 67 engage are formed throughout the circumferential direction.

Therefore, if the assembly of the turbine 4 and the connecting plate 70 is simply inserted in the rotation axis XX direction when the torque converter 1 is assembled, since the connecting protrusion 67f of the second mass plate 67 is coupled to the engaging groove portion 74 of the connection plate 70 and the coupling between the connecting plate 70 and the second mass plate 67 is completed, the entire assembly process of the torque converter 1 may be simplified.

In addition, in the shown exemplary embodiment, the connection protrusion 67f in the rotation axis (X-X) direction is formed at the second mass plate 67, and the engaging groove portion 74 is formed at the connection plate 70, however the present invention is not limited thereto, and it may be configured such that the engaging groove portion is formed at the second mass plate 67, and the connection protrusion extending in the rotation axis (X-X) direction is formed at the connection plate 70, and such modifications are naturally within the scope of the present invention.

Third Elastic Body

In a state in which the second coil spring 68 as a second elastic member elastically connecting the first mass plate 66 and the second mass plate 67, and the driven plate 63 of the output member with respect to the rotational direction, is inserted into the first spring hole 63g of the driven plate 63, both ends thereof are supported by the inner locking portion 63c of the first spring hole 63g, and the spring locking portions 66d and 67d of the first mass plate 66 and the second mass plate 67, to be elastically deformable in the rotational direction.

Therefore, if the driven plate 63, the first mass plate 66, the second mass plate 67, the additional mass body 69, and the inertial mass body including the turbine 4 are relatively rotated, the second coil spring 68 is compressed in the rotational direction, and thus a vibration having a phase opposite to that of the vibration input to the driven plate 63 is applied to the driven plate 63 so that the torque in a state where the vibration is attenuated is finally transmitted to the output hub 43.

<Operation of the Torque Converter>

Next, the operation of the torque converter 1 including the lock-up device 6 according to an exemplary embodiment of the present invention is described with reference to FIG. 7.

In the state where the front cover 2 and the impeller 3 are rotating, the hydraulic oil flows from the impeller 3 to the turbine 4, and the power is transmitted from the impeller 3 to the turbine 4 via the hydraulic oil. The power transmitted to the turbine 4 is transmitted to the input shaft of the transmission, not shown, via the output hub 43 through the first mass plate 66, the second mass plate 67 and the driven plate 63.

If the rotational speed of the input shaft remains approximately constant, the power transfer through the lockup device 6 is started. More specifically, the piston 61 moves to the engine side according to the change in the hydraulic pressure, and the friction member 61a of the piston 61 is pressed toward the inner side surface of the front cover 2.

As a result, the piston 61 rotates integrally with the front cover 2, and the power is transmitted from the front cover 2 to the drive plate 62 via the piston 61.

If the power is transmitted to the drive plate 62, while the first coil spring 64 and the auxiliary coil spring 65 are primarily compressed in the rotational direction between the spring locking portion 62b of the drive plate 62 and the outer locking portion 63b of the driven plate 63, the power of which the torsional vibration is attenuated is transmitted to the driven plate 63.

On the other hand, if the power is transmitted to the driven plate 63, the second the coil spring 68 is compressed in the rotational direction between the inner locking portion 63d of the driven plate 63 and the spring locking portions 66d and 67d of the first mass plate 66 and second mass plate 67, and the vibration of the dynamic damper DD having a phase opposite to that input to the driven plate 63 is transmitted to the driven plate 63 through the second coil spring 68.

As a result, the power of which the vibration is finally attenuated is transmitted to the output hub 43 via the driven plate 63.

As described above, those skilled in the art will appreciate that the present invention may be carried out in other specific ways than those set forth herein without departing from the spirit and essential characteristics of the present invention.

Therefore, the present invention is not limited to the examples described above and covers modifications of the technical spirit substantially equivalent thereto, and the scope of the invention is defined not by the detailed description of the invention but by the appended claims, and all differences within the scope will be construed as within the scope of the present invention.

DESCRIPTION OF SYMBOLS

1: torque converter 2: front cover
3: impeller 4: turbine
5: stator 6: lock-up device
61: piston 62: drive plate
63: driven plate 64: first coil spring
65: auxiliary coil spring 66: first mass plate
67: second mass plate 68: second coil spring
69: additional mass body D: damper mechanism
DD: dynamic damper

What is claimed is:

1. A lock-up device for a torque converter disposed between a front cover connected to an engine output side and a turbine, comprising:
   an input member to which a torque is input from the front cover through a friction force;
   an output member connected to an output hub to be integrally rotated and provided to be relatively rotatable with respect to the input member;
   a first elastic body elastically connecting the input member and the output member with respect to a rotational direction; and
   a dynamic damper directly installed to the output member, the dynamic damper including an inertial mass body relatively rotatable with respect to the output member and a second elastic body elastically connecting the inertial mass body and the output member with respect to the rotational direction, the inertial mass body includes:
      a first mass plate disposed in close contact with one side of the output member;
      a second mass plate disposed in close contact with an other side of the output member and integrally rotating with the first mass plate; and
      an additional mass body fixed to the first mass plate at a position more inward in a radial direction than the second elastic body,
   wherein the second mass plate is connected to the turbine by a connection plate such that the second mass plate and the turbine are integrally rotated and the connection plate is relatively rotatable with the output hub, and
   wherein the dynamic damper is disposed in the radial direction inside with respect to the first elastic body.

2. The lock-up device for torque converter of claim 1, wherein
   wherein the inertial mass body and the second elastic body are disposed to at least partially overlap the first elastic body with respect to a rotation axis direction when viewing in the radial direction.

3. The lock-up device for torque converter of claim 2, wherein
   wherein the first mass plate and the second elastic body are disposed to entirely overlap the first elastic body with respect to the rotation axis direction when viewing in the radial direction.

4. The lock-up device for torque converter of claim 3, wherein
   the second mass plate includes a connection protrusion extending toward the turbine, and
   the second mass plate is connected to the turbine through the connection protrusion such that the second mass plate and the turbine are integrally rotated.

5. The lock-up device for torque converter of claim 4, wherein the connection plate includes an engaging groove portion to which the connection protrusion is inserted and engaged in the rotation axis direction.

6. The lock-up device for torque converter of claim 5, wherein
   the connection plate is supported by the output hub to be relatively rotatable.

* * * * *